(12) United States Patent
Oglesby

(10) Patent No.: US 7,569,098 B2
(45) Date of Patent: Aug. 4, 2009

(54) GAS LIQUID SOLID COMPACT CYCLONIC SEPARATOR

(75) Inventor: Kenneth Doyle Oglesby, Tulsa, OK (US)

(73) Assignee: Regency Technologies, LLC, Tulsa, OK (US)

( * ) Notice: Subject to any disclaimer, the term of this patent is extended or adjusted under 35 U.S.C. 154(b) by 510 days.

(21) Appl. No.: 11/335,203

(22) Filed: Jan. 19, 2006

(65) Prior Publication Data

US 2006/0162561 A1 Jul. 27, 2006

Related U.S. Application Data

(60) Provisional application No. 60/645,718, filed on Jan. 21, 2005.

(51) Int. Cl.
*B01D 19/00* (2006.01)
(52) U.S. Cl. ............... 95/253; 95/261; 96/183; 96/209
(58) Field of Classification Search ............ 95/253, 95/261; 96/183, 185, 186, 209, 210, 211, 96/212

See application file for complete search history.

(56) References Cited

U.S. PATENT DOCUMENTS

| 3,127,255 | A | * | 3/1964 | Winslow | 96/178 |
| 4,737,168 | A | * | 4/1988 | Heath | 95/253 |
| 5,224,604 | A | * | 7/1993 | Duczmal et al. | 209/12.2 |
| 5,256,171 | A | * | 10/1993 | Payne | 95/19 |
| 6,190,543 | B1 | * | 2/2001 | Christiansen | 210/87 |
| 6,413,297 | B1 | * | 7/2002 | Morgan et al. | 95/22 |
| 2005/0115273 | A1 | * | 6/2005 | Bakker et al. | 62/601 |

* cited by examiner

*Primary Examiner*—Duane Smith
*Assistant Examiner*—Douglas J Theisen
(74) *Attorney, Agent, or Firm*—Head, Johnson & Kachigian

(57) ABSTRACT

A compact cyclonic separator is described which can handle mixtures of solids, liquids and gases in one vessel and provide continuous separation. The invention operates by providing tangential flow into a vertical cylindrical tube and utilizing the tangential flow and gravity to separate into a gas stream, a clean liquids stream, and a solid rich slurry mixture. Several embodiments for controlling the flow of the solid rich slurry mixture are described.

30 Claims, 5 Drawing Sheets

GAS LIQUID SOLID COMPACT CYCLONIC SEPARATOR

CROSS-REFERENCE TO RELATED APPLICATIONS

This application claims the benefit of U.S. provisional Ser. No. 60/645,718, filed Jan. 21, 2005 by the present inventor.

TECHNICAL FIELD

This instant invention relates to the separation of gases, liquids and solids in various processes. More particularly it takes gasified slurries and helps separate them into their major components.

BACKGROUND

The petroleum, chemical, and cement industries, among others, often require the transport of slurries (solid rich liquids) as part of their process handling. For instance, in the oil and gas drilling industry, mixtures coming from the well in the drilling process must be processed for study, and or reuse. Because such mixtures often contain gas also, separation of the liquids, gases and solids is often required. Then, each phase is further processed as needed. The separation can involve devices such as separators, 'gas busters', hydrocyclones and shakers. The combination of several vessels and the piping, valves, and control schemes to keep them all working together, can be expensive in terms of both money and space requirements.

There is a need then for a better solution, a more compact, less expensive step for separation of these phases.

SUMMARY

The needs discussed above are addressed by the instant invention. One aspect of the instant invention is an apparatus for separating a mixture of solids, liquids, and gases including at least a vertical cylindrical tube; a tangential inlet for the mixture at an inlet location between the top and the bottom of the vertical cylindrical tube; a top exit point from the vertical cylindrical tube for transporting gases; a centralized vertical pipe that extends from the bottom of the vertical cylindrical tube to a point below the top exit point; a first bottom exit point for transporting liquids from the vertical cylindrical tube in communication with the centralized vertical pipe; and a second bottom exit point for draining solid rich slurry mixtures from the vertical cylindrical tube, the second bottom exit point being offset from center of the vertical cylindrical tube.

Another aspect of the instant invention is a similar apparatus in which the flow of the solid rich slurry mixture from the annulus area between the outer vertical cylindrical tube and the centralized vertical pipe is controlled by an inflatable element/packer that expands or contracts in that same annulus area based on hydraulic or pneumatic means.

Another aspect of the invention is a similar apparatus in which the flow of solid rich slurry mixture from the annulus area between the outer cylindrical tube and the centralized vertical pipe is controlled by an annulus valve that is a sealing means with sealing elements that seal to the bottom edge of the outer cylindrical tube with vertical movement from a hydraulic, pneumatic, electrical, or manual pump system below or attached to the sealing means.

Another aspect of the invention is an apparatus to keep the solid rich slurry mixture from plugging the lower part of the vertical cylindrical tube using ribs, fins or spirals attached to the outer surface of the centralized vertical pipe coupled with vertical movement of the centralized vertical pipe.

Another aspect of the invention is an apparatus to keep the solid rich slurry mixture from plugging the lower part of the vertical tube using spiraled fins, ridges, or ribs on the outer surface of the centralized vertical pipe coupled with rotational movement.

Another aspect of the invention is an apparatus to keep the solid rich slurry mixture from plugging the lower part of the vertical tube using blades on the top surface of the bottom sealing means coupled with rotational movement of the bottom sealing means.

The invention also includes a method for separating a mixture of solids, liquids, and gases including at least the steps of feeding the mixture into a cylindrical vessel at a tangential angle; withdrawing clean liquids from a first bottom point of the cylindrical vessel; withdrawing a solids rich slurry from a second bottom point bottom of the cylindrical vessel; and withdrawing a gas stream from a top point of the cylindrical vessel.

To insure that a clear and complete explanation is given to enable a person of ordinary skill in the art to practice the invention specific examples will be given involving applying the invention to a specific configuration of a gas-liquid-solid separator. It should be understood though that the inventive concept could apply to various modifications of such separator systems and the specific examples are not intended to limit the inventive concept to the example application.

DETAILED DESCRIPTION

Figure 1:
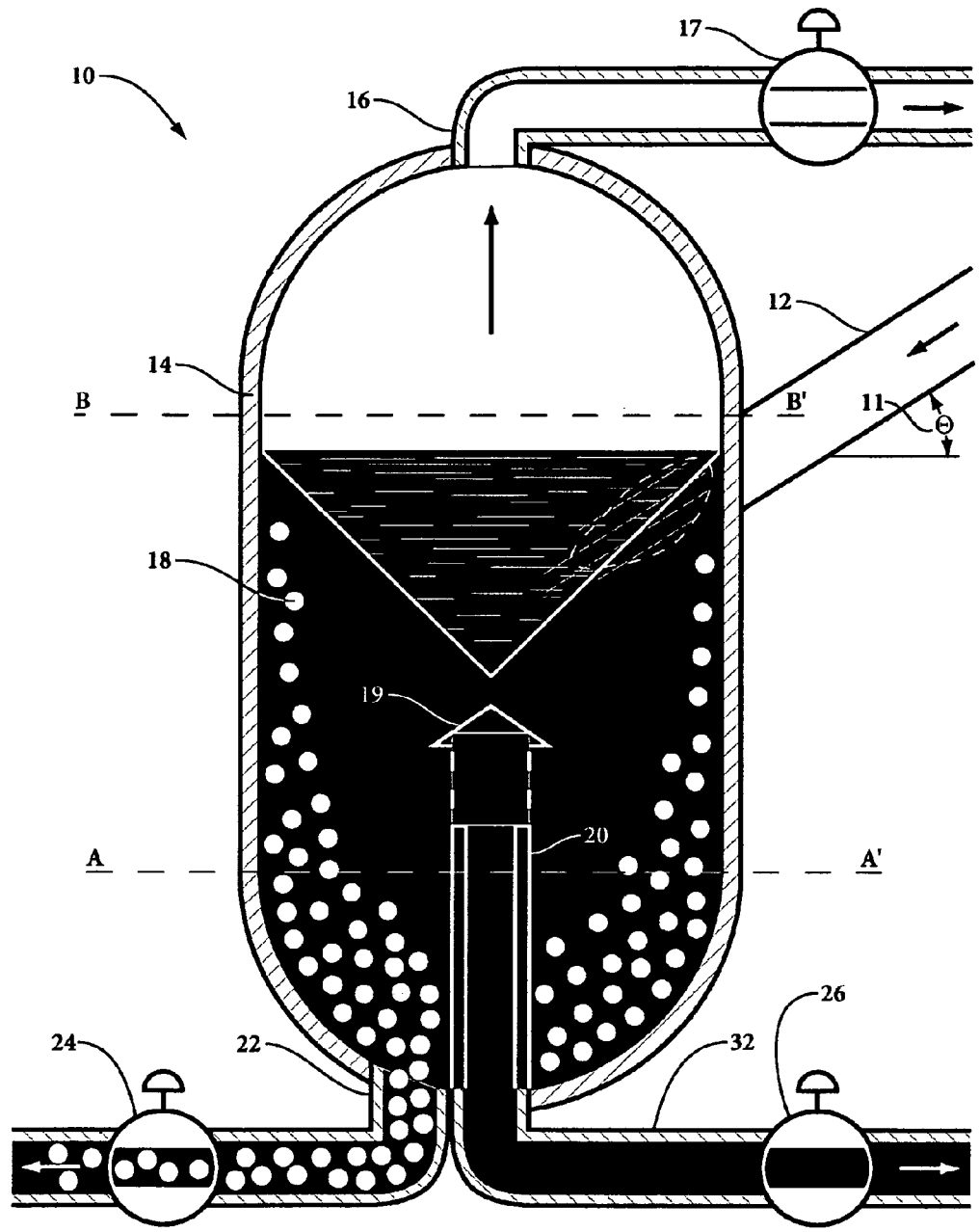
FIG. 1 is a side cross-section view of the separator of the instant invention.

FIG. 1 is a side view of a vertical compact gas-liquids-solids separator of the instant invention, shown generally by the numeral 10. It is important to note in this figure and the remaining figures that the actual height to diameter ratio of cylindrical tube 14 may be different than shown here but was shown in this manner to provide clarity to the mechanisms involved. In addition the walls of cylindrical tube 14 can be parallel or non-parallel. The mixture to be separated, which can have solids, liquids, and gases, enters the inlet leg 12 that intersects the side of vertical cylindrical tube 14 tangentially causing the mixture from the inlet leg to swirl in vertical cylindrical tube 14. The angle 11 of inlet leg 12 from the horizontal can vary. A preferred angle is between 20 and 40 degrees and more preferably between 27 and 31 degrees. The tangential nature of the flow can be envisioned also by looking ahead to FIG. 3 in which the inlet leg 12 is shown from above (B - - - B' cross section) vertical cylindrical tube 14. This additional centrifugal force caused from the swirling action causes the gases, liquids and solids to separate laterally by their density and particle size while gravity then causes separation in the vertical direction, also by the same factors.

Returning to FIG. 1, gases will move to the center and up, through exit line 16, liquids will move out and down relative to the gases and pass through interior vertical pipe 20, and the heavier solid particles 18 will progress to the outside edge of vertical cylindrical tube 14 and will then move downward along that same outer edge and below the clean liquids.

Gas exits out at a point at the top of the separator into line 16 with rate, level, and pressure regulated by control valve 17. A centralized vertical pipe 20 extending upward from a point at the bottom of the separator and ending below the established liquids level, allows cleaner (ie, less solids laden) fluids to exit the cyclonic separator with rate, level, and pressure regulated by control valve 26. A cap 19 is suspended above vertical pipe 20 by a structure that readily allows fluids to flow under the cap into tube 20. This structure could be a screen material or simple support struts. Due to the centrifugal forces, the solid rich slurry mixture continues down the annulus area between the outer wall of 14 and this interior centralized vertical pipe 20 to exit at the bottom of the separator through an exit point into line 22. The exit lines 22,32 can have controlling valves 24,26 to control flow rate and liquid—solid levels. These control valves can be operated/controlled manually or with an automated central processor/monitor which will monitor tube 14 level, pressure, rates of gas, clean fluids and solids-rich mixture, solids-rich mixture density and other factors.

Figure 2:
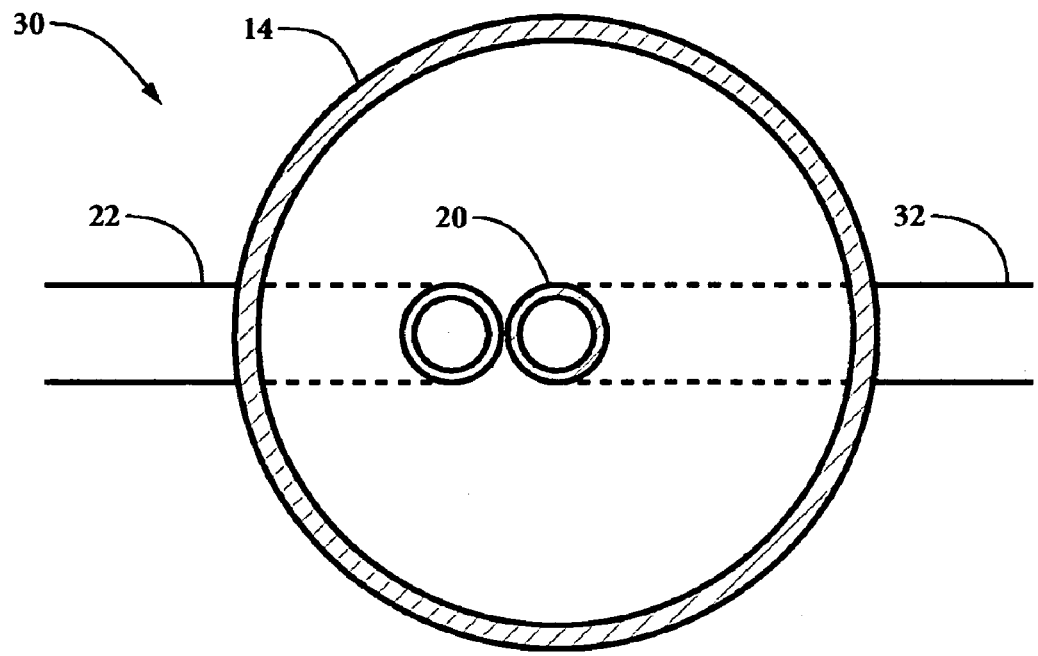
FIG. 2 is a top cross section view of the separator of the instant invention.
Figure 3:
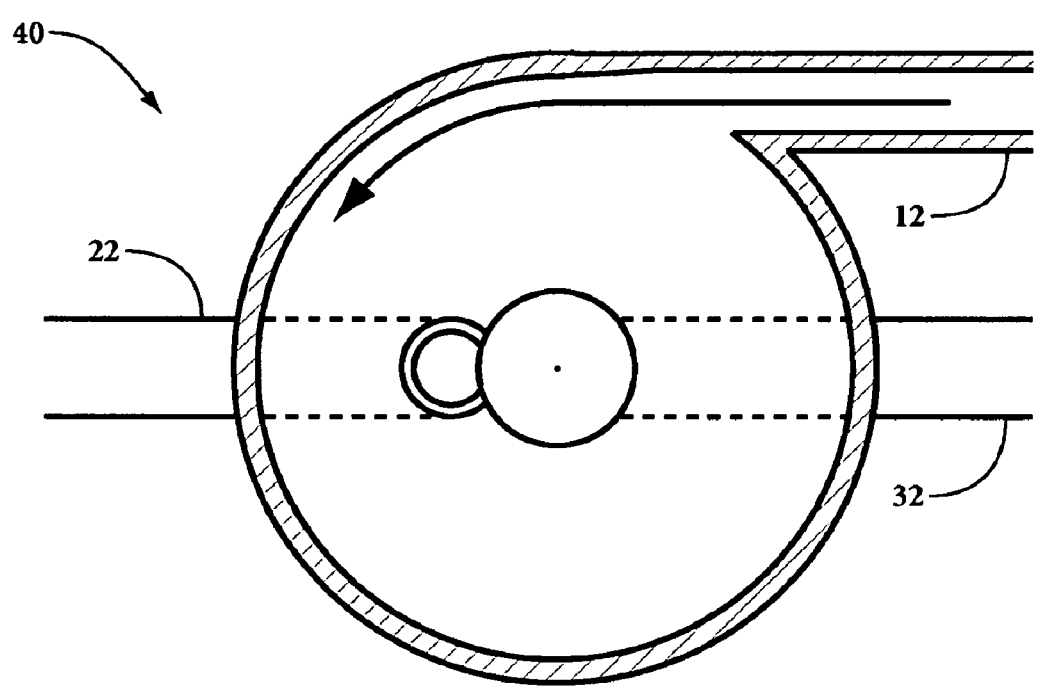
FIG. 3 is a different top cross section view of the separator of the instant invention.

FIGS. 2 and 3 are both cross-section views of vertical cylindrical tube 14 at two different cross-sections. FIG. 2, shown generally as 30 is a cross section depiction of the separator in FIG. 1 at the A-A' cross-section showing the centralized vertical pipe point 20 and the corresponding clean fluid exit pipe 32. FIG. 3, shown generally as 40, is a cross section depiction of the separator in FIG. 1 at the B-B' cross-section showing tangential inlet 12. Tangential inlet 12 can be configured to input the gas-liquid-solid mixture in either a clockwise or counter-clockwise manner. Both figures also show the solids rich exit pipe 22.

Figure 4:
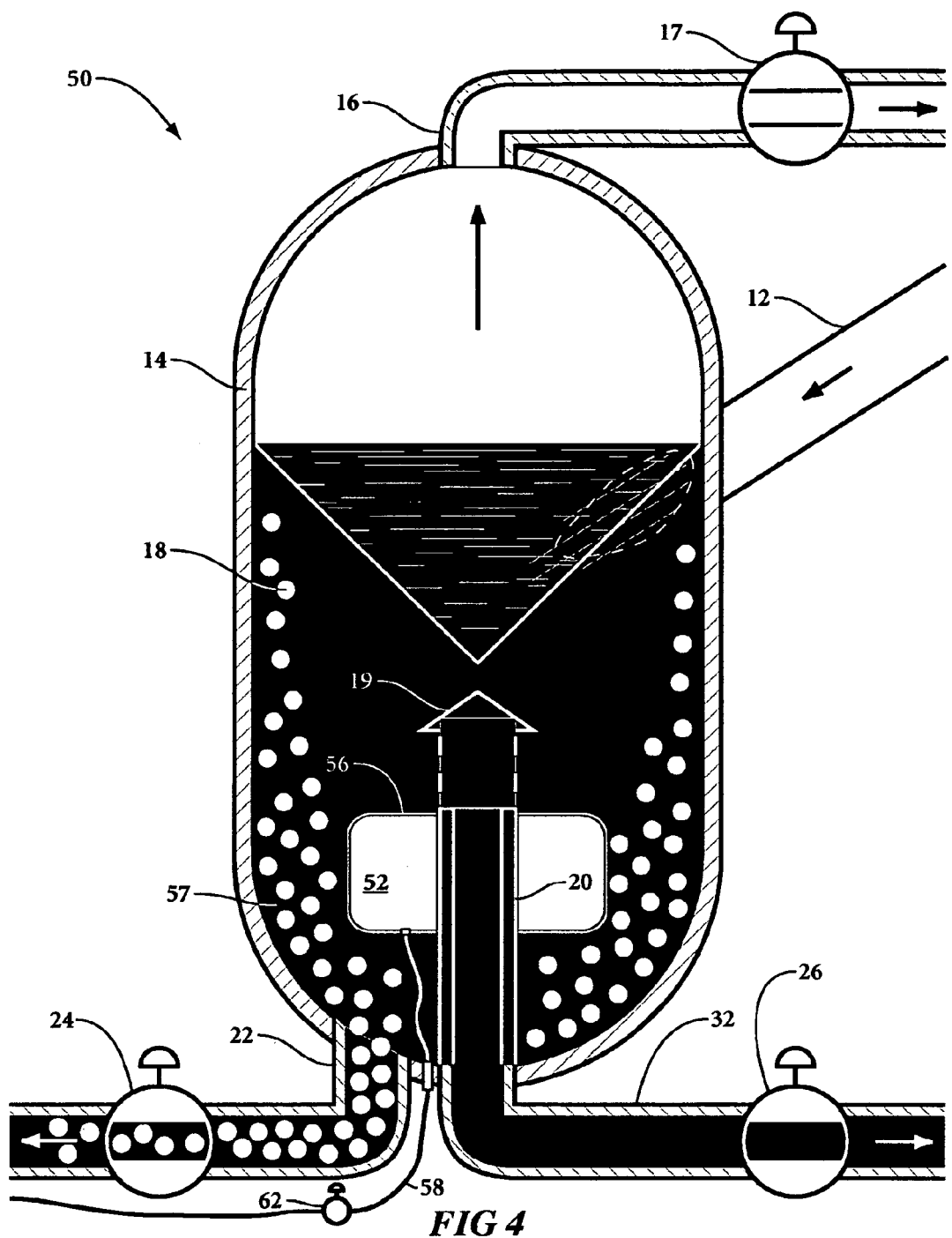
FIG. 4 is a side cross-section view of another embodiment of the separator of the instant invention.

FIG. 4, shown generally as the numeral 50, is similar to FIG. 1 but shows an alternate method for control of the flow of the solid rich slurry mixture. In this method, an inflatable element/packer 52, within the annulus of vertical cylindrical tube 14 and around centralized vertical pipe 20 for the clean fluid, is used to control the flow rate/exit rate of the solid rich slurry mixture by expanding or contracting to open or close the gap shown at 57. This inflatable control method also helps prevent plugging of solids in the bottom of the separator, since it can be fully opened to allow the pressure differential within the separator to dislodge solids. A protective mesh 56 (steel or otherwise harder material than the elastomer elements of the packer) can cover the elastomer material to prevent erosive wear of the inflatable element A hydraulic or pneumatic pump (not shown) connected via line 58 to a reservoir and control valve 62 is needed to set and adjust inflatable element/packer 52 to control flow rate. The additional valve 24 shown in this figure on the exit line is added only for additional safety and is not strictly needed.

Figure 5:
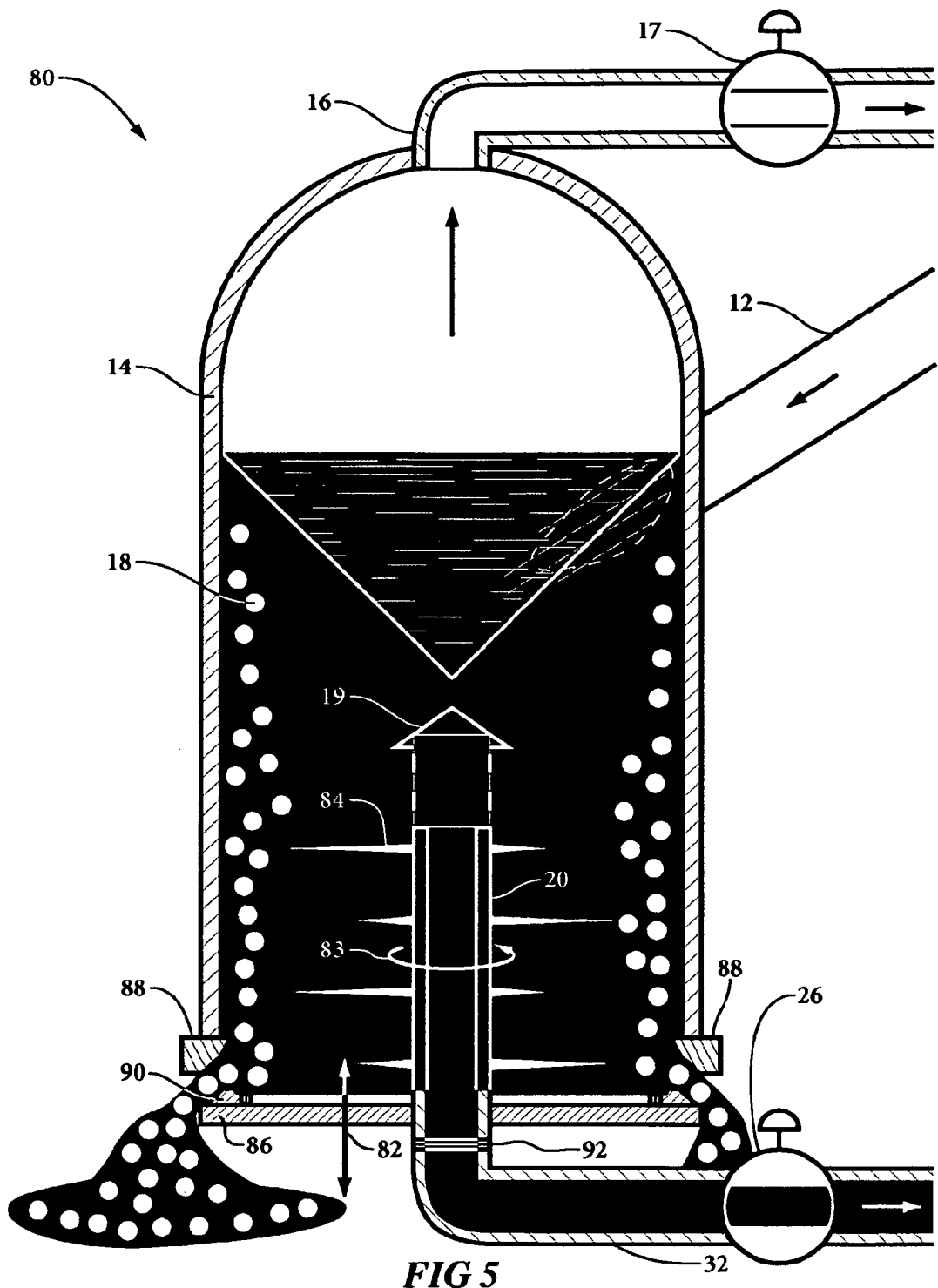
FIG. 5 is a side cross-section view of another embodiment of the separator of the instant invention.

FIG. 5, shown generally by the numeral 80 is similar to FIG. 4 but shows another embodiment for the solid rich slurry mixture flow control. In this embodiment a hydraulic, pneumatic, electric, or manual motor, not shown but illustrated as movement arrow 82, moves a bottom sealing means 86 up or down to create a seal between sealing means 86 and a bottom ring 88 around vertical cylindrical tube 14, thereby controlling the opening for and the flow rate of the solid rich slurry mixture. The sealing means 86 could be configured in several ways—a flat plate is a preferred embodiment. The shapes and angles of these elements shown are somewhat arbitrary and a number of configurations are possible for this embodiment. This bottom sealing means 86 has an upper and outer elastomer element 90 for sealing. This elastomer element encounters and meets and seals to the lower end of the vertical cylindrical tube 14 at bottom ring 88. This contact can be at some angle to maximize contact area. The clean fluid's centralized vertical pipe 20 is sealed to sealing means 86 to prevent leakage but can move independent of this sealing means 86 or it can be directly connected to sealing means 86 and move (vertical or rotational) with it. The bottom exit pipe 32 is connected to the interior centralized vertical pipe 20 at swivel point 92. The swivel 92 allows rotation of centralized vertical pipe 20 and provides a connection to stationary exit pipe 32.

This bottom sealing means 86 and/or the vertical centralized pipe 20, (either together, connected or separately and independently) can also rotate, as shown by rotational arrow 83, by electric, pneumatic, or hydraulic means. With optional spiraled fins, ridges, or ribs 84 on the outside of the vertical centralized tube, and connected to the bottom sealing means, this rotating action will help grind and/or auger the solids down and out of tube 14, preventing plugging. The possible combination of both actions (rotational and vertical movements) can help prevent solids buildup and plugging. A seal of some method and rating must exist where the bottom sealing means 86 and the centralized vertical pipe 20 meets. This seal allows rotational or vertical movement between 86 and 20 as stated earlier.

Figure 6:
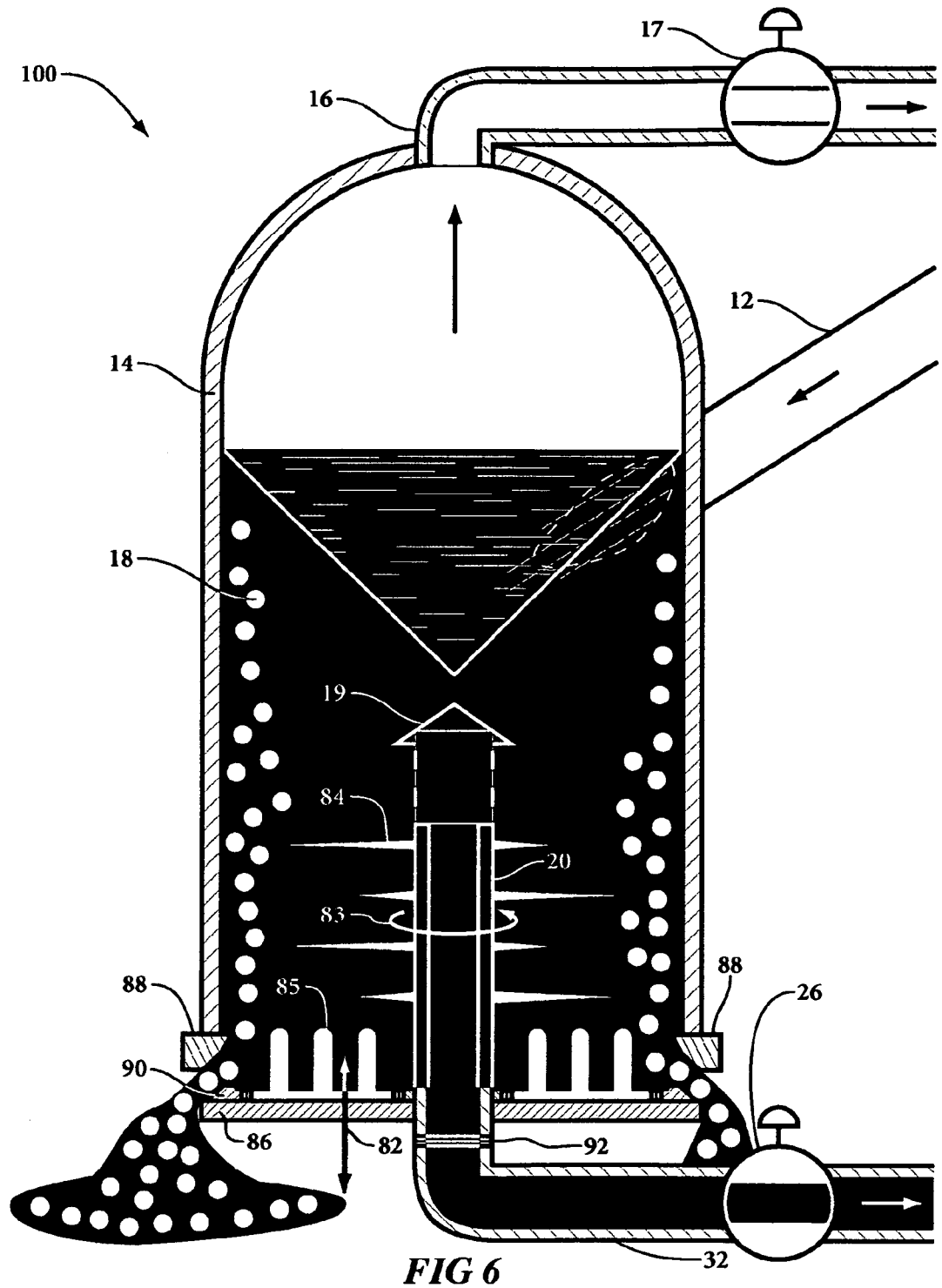
FIG. 6 is a side cross-section view of another embodiment of the separator of the instant invention.

FIG. 6, shown generally by the numeral 100 is similar to FIG. 5 but shows another embodiment for the solid rich slurry mixture flow control. Again the bottom sealing means can rotate, as shown by rotational arrow 83, and/or stroke as shown by arrow 82, either by electric, pneumatic, or hydraulic means. In this embodiment paddles or blades 85 extend up from the sealing means into the annulus and rotate with sealing means 86, and can aid in keeping the solids mixture fluid and moving. Again, movement, either rotational or vertical between sealing means 86 and centralized vertical pipe 20 can be connected or independent.

While one (or more) embodiment(s) of this invention has (have) been illustrated in the accompanying drawings and described above, it will be evident to those skilled in the art that changes and modifications may be made therein without departing from the essence of this invention. All such modifications or variations are believed to be within the sphere and scope of the invention as defined by the claims appended hereto.

The invention claimed is:

1. An apparatus for separating a mixture of solids, liquids, and gases comprising:

a. a vertical cylindrical tube;

b. a tangential inlet for said mixture at an inlet location between the top and the bottom of said vertical cylindrical tube wherein said tangential inlet enters said vertical cylindrical tube at a positive (i.e. downward flow direction) angle with respect to horizontal;

c. a top exit point from said vertical cylindrical tube for transporting gases;

d. a centralized vertical pipe that extends from the bottom of said vertical cylindrical tube to a point below said top exit point;

e. a first bottom exit point for transporting liquids from said vertical cylindrical tube in communication with said centralized vertical pipe; and f. a second bottom exit point for draining solid rich slurry mixtures from said vertical cylindrical tube.

2. The apparatus of claim 1 wherein said angle is between 20 and 40 degrees with respect to the horizontal.

3. The apparatus of claim 1 wherein said vertical cylindrical tube has non-parallel walls.

4. The apparatus of claim 1 further comprising an inflatable element placed within the annulus of said vertical cylindrical tube.

5. The apparatus of claim 4 wherein said inflatable element is in communication with a hydraulic system that can inflate the element.

6. The apparatus of claim 4 wherein said inflatable element is enclosed in a protective mesh.

7. The apparatus of claim 1 further comprising a bottom sealing means meeting and sealing to the lower end of said vertical cylindrical tube.

8. The apparatus of claim 7 further comprising spiraled fins, ridges, or ribs attached to the outside surface of said centralized vertical pipe.

9. The apparatus of claim 7 wherein said bottom sealing means is attached to said centralized vertical pipe.

10. The apparatus of claim 7 wherein said bottom sealing means is sealed to but moves independently of said centralized vertical pipe.

11. The apparatus of claim 10 further comprising a motor to move said centralized vertical pipe in a reciprocating vertical motion.

12. The apparatus of claim 11 further comprising spiraled fins, ridges, or ribs attached to the outside of said centralized vertical pipe.

13. The apparatus of claim 9 further comprising a motor to rotate said bottom sealing means.

14. The apparatus of claim 13 further comprising spiraled fins, ridges, or ribs attached to the outside surface of said centralized vertical pipe.

15. The apparatus of claim 13 further comprising blades attached to said bottom sealing means and extending up into annulus of said vertical cylindrical tube.

16. The apparatus of claim 9 further comprising a motor to move said bottom sealing means vertically.

17. The apparatus of claim 10 further comprising a motor to rotate said centralized vertical pipe.

18. The apparatus of claim 17 further comprising spiraled fins, ridges, or ribs attached to the outside surface of said centralized vertical pipe.

19. The apparatus of claim 10 where a motor moves said bottom sealing means vertically.

20. The apparatus of claim 16 further comprising spiraled fins, ridges, or ribs attached to the outside surface of said centralized vertical pipe.

21. The apparatus of claim 10 further comprising a motor to rotate said bottom sealing means.

22. A method for separating a mixture of solids, liquids, and gases comprising the steps of;
   a. feeding said mixture into a vertical cylindrical vessel at a tangential angle, wherein said mixture enters said vertical cylindrical vessel through a tangential inlet at a positive (i.e. downward flow direction) angle with respect to horizontal;
   b. withdrawing clean liquids from a first bottom point of said cylindrical vessel
   c. withdrawing a solids rich slurry from a second bottom point of said cylindrical vessel; and
   d. withdrawing a gas stream from a top point of said cylindrical vessel.

23. The method of claim 22 further comprising inflating an inflatable element within said cylindrical vessel.

24. The method of claim 22 wherein said step of withdrawing a solids rich slurry comprises the step of moving a bottom sealing means of said cylindrical vessel in a vertical direction.

25. The method of claim 22 further comprising rotating a vertical pipe located in the annulus of said cylindrical vessel.

26. The method of claim 22 further comprising rotating a bottom sealing means of said cylindrical vessel.

27. An apparatus for separating a mixture of solids, liquids, and gases comprising:
   a. a vertical cylindrical tube;
   b. a tangential inlet for said mixture at an inlet location between the top and the bottom of said vertical cylindrical tube;
   c. a top exit point from said vertical cylindrical tube for transporting gases;
   d. a centralized vertical pipe that extends from the bottom of said vertical cylindrical tube to a point below said top exit point;
   e. a first bottom exit point for transporting liquids from said vertical cylindrical tube in communication with said centralized vertical pipe;
   f. a second bottom exit point for draining solid rich slurry mixtures from said vertical cylindrical tube; and
   g. A bottom sealing means meeting and sealing to the lower end of said vertical cylindrical tube.

28. A method for separating a mixture of solids, liquids, and gases comprising the steps of;
   a. feeding said mixture into a cylindrical vessel at a tangential angle;
   b. withdrawing clean liquids from a first bottom point of said cylindrical vessel;
   c. withdrawing a solids rich slurry from a second bottom point of said cylindrical vessel including the step of moving a bottom sealing means of said cylindrical vessel in a vertical direction; and
   d. withdrawing a gas stream from a top point of said cylindrical vessel.

29. A method for separating a mixture of solids, liquids, and gases comprising the steps of;
   a. feeding said mixture into a cylindrical vessel at a tangential angle;
   b. withdrawing clean liquids from a first bottom point of said cylindrical vessel;
   c. withdrawing a solids rich slurry from a second bottom point of said cylindrical vessel;
   d. withdrawing a gas stream from a top point of said cylindrical vessel; and
   e. rotating a vertical pipe located in the annulus of said cylindrical vessel.

30. A method for separating a mixture of solids, liquids, and gases comprising the steps of;
   a. feeding said mixture into a cylindrical vessel at a tangential angle;
   b. withdrawing clean liquids from a first bottom point of said cylindrical vessel;
   c. withdrawing a solids rich slurry from a second bottom point of said cylindrical vessel;
   d. withdrawing a gas stream from a top point of said cylindrical vessel; and
   e. rotating a bottom sealing means of said cylindrical vessel.

* * * * *

UNITED STATES PATENT AND TRADEMARK OFFICE
CERTIFICATE OF CORRECTION

PATENT NO. : 7,569,098 B2
APPLICATION NO. : 11/335203
DATED : August 4, 2009
INVENTOR(S) : Kenneth Doyle Oglesby It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 707 days.

Signed and Sealed this

Seventh Day of September, 2010

David J. Kappos
*Director of the United States Patent and Trademark Office*